US012736094B2

(12) United States Patent
Mikan et al.

(10) Patent No.: US 12,736,094 B2
(45) Date of Patent: Sep. 15, 2026

(54) RESETTABLE MECHANICAL DISCONNECT

(71) Applicant: Honeywell International Inc., Charlotte, NC (US)

(72) Inventors: Albert Mikan, Prague (CZ); Tibor Merka, Hodonín (CZ); Michal Nozka, Český Těšín (CZ); David Klistinec, Brno (CZ)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 19/061,556

(22) Filed: Feb. 24, 2025

(65) Prior Publication Data

US 2026/0251186 A1 Aug. 27, 2026

(51) Int. Cl.
*F16D 23/12* (2006.01)
*F16D 11/14* (2006.01)
(Continued)

(52) U.S. Cl.
CPC .............. *F16D 23/12* (2013.01); *F16D 11/14* (2013.01); *F16D 48/06* (2013.01);
(Continued)

(58) Field of Classification Search
CPC ........................... F16D 2023/123; F16D 11/14
See application file for complete search history.

(56) References Cited

U.S. PATENT DOCUMENTS 4,244,455 A * 1/1981 Loker ..................... F16D 11/04 192/24
4,566,566 A * 1/1986 Vuillet ................... G05G 17/00 192/24

(Continued)

FOREIGN PATENT DOCUMENTS

DE 102015204660 A1 9/2016
EP 3121473 A1 1/2017

(Continued)

OTHER PUBLICATIONS

European Patent Office, "Extended European Search Report", dated Jun. 25, 2026, from EP Application No. 26155537.9, from Foreign Counterpart to U.S. Appl. No. 19/061,556, pp. 1 through 7, Published: EP.

*Primary Examiner* — Stacey A Fluhart
(74) *Attorney, Agent, or Firm* — Fogg & Powers LLC

(57) ABSTRACT

A resettable mechanical disconnect comprises: first and second shafts having coupling features to engage each other such that first and second shafts rotate together around first axis; axial surface of ramp increasing in height around outer surface of second shaft around first axis; pawl and spring to rotate toward radial surface of ramp of second shaft; movable pin to retain pawl in place away from ramp when extended; control mechanism to retract movable pin; when control mechanism causes movable pin to retract, spring causes pawl to rotate about second axis to contact radial surface of ramp; pawl applies pressure against ramp as it rotates and pressure of pawl against increase in height of axial surface of ramp causes second shaft to move away from first shaft axially along first axis such that coupling features shafts disengage to cause first shaft and second shaft to no longer rotate together.

20 Claims, 11 Drawing Sheets

(51) Int. Cl.
*F16D 48/06* (2006.01)
*F16D 125/36* (2012.01)
*F16D 127/02* (2012.01)

(52) U.S. Cl.
CPC .... *F16D 2023/123* (2013.01); *F16D 2125/36* (2013.01); *F16D 2127/02* (2013.01); *F16D 2500/10462* (2013.01)

(56) References Cited

U.S. PATENT DOCUMENTS 4,936,247 A * 6/1990 Sundstrom ............. B64D 35/00 116/281
5,103,949 A * 4/1992 Vanderzyden .......... F16D 11/04 192/24
5,941,532 A 8/1999 Flaherty et al.
6,257,589 B1 7/2001 Flaherty et al.
8,225,919 B2 * 7/2012 Harris ..................... F16D 23/12 192/114 R
8,963,391 B2 2/2015 Grosskopf et al.
9,759,272 B2 * 9/2017 Sunada ................. F16D 27/108
10,180,166 B2 1/2019 Grosskopf et al.
10,323,736 B2 * 6/2019 Beard ....................... F02C 7/32
10,641,344 B2 * 5/2020 Hochstetler ............ H02K 7/003
10,677,292 B2 * 6/2020 Campbell ............... F16D 23/12
10,823,230 B2 * 11/2020 Hochstetler ............... F02C 7/32
11,018,553 B2 5/2021 Behling et al.
12,060,918 B2 8/2024 Finke et al.
2008/0115608 A1 5/2008 Birdi et al.
2018/0209487 A1 * 7/2018 Quehenberger ........ F16D 23/14
2021/0119511 A1 4/2021 Bloor
2023/0039164 A1 * 2/2023 Finke ...................... F16D 23/12
2024/0258882 A1 8/2024 Anghel et al.

FOREIGN PATENT DOCUMENTS

EP 4130503 A1 2/2023
GB 2592973 A 9/2021

* cited by examiner 100
116
116
114
108
126
124
122
106

100
106
108
114
116
116
118
122
124
126
128

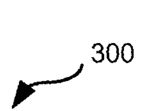

RECEIVING ELECTRICAL CONTROL SIGNAL AT CONTROL MECHANISM
302

CAUSING, BASED ON ELECTRICAL CONTROL SIGNAL, MOVABLE PIN TO RETRACT, ALLOWING SPRING TO CAUSE PAWL TO ROTATE ABOUT FIRST AXIS TO COME INTO CONTRACT WITH RAMP SECTION OF FIRST SHAFT PORTION OF RESETTABLE MECHANICAL DISCONNECT
304

APPLYING SPRING TO CAUSE PAWL TO APPLY PRESSURE AGAINST RAMP SECTION OF FIRST SHAFT PORTION AS IT ROTATES ABOUT SECOND AXIS, PRESSURE OF PAWL AGAINST INCREASE IN HEIGHT OF RAMP SECTION OF FIRST SHAFT PORTION ABOUT SECOND AXIS CAUSE FIRST SHAFT PORTION TO MOVE AWAY FROM SECOND SHAFT PORTION AXIALLY ALONG SECOND AXIS SUCH THAT FIRST COUPLING FEATURES OF FIRST SHAFT PORTION DISENGAGE FROM SECOND COUPLING FEATURES OF SECOND SHAFT PORTION TO CAUSE FIRST SHAFT PORTION AND SECOND SHAFT PORTION TO NO LONGER ROTATE TOGETHER, THEREBY MECHANICALLY DISCONNECTING FIRST SHAFT PORTION FROM SECOND SHAFT PORTION
306

*FIG. 3*

RESETTABLE MECHANICAL DISCONNECT

BACKGROUND

Rotary machines can be connected together with rotating shafts.

SUMMARY

A resettable mechanical disconnect comprises: a first shaft portion positioned about a first axis and having first coupling features positioned at a first end of the first shaft portion; and a second shaft portion positioned about the first axis and adjacent to the first shaft portion, the second shaft portion having: second coupling features positioned at a second end of the second shaft portion and configured to engage with the first coupling features of the first shaft portion to cause the first shaft portion and the second shaft portion to rotate together radially about the first axis; and a ramp section positioned around an outer surface of the second shaft portion, an axial surface of the ramp section increasing in height around the outer surface of the second shaft portion about the first axis; a controllable spring loaded rotatable pawl apparatus having: a pawl configured to rotate about a second axis toward a radial surface of the ramp section of the second shaft portion; a spring configured to cause the pawl to rotate about the second axis toward the radial surface of the ramp section of the second shaft portion; a movable pin configured to retain the pawl in place away from the ramp section when extended; and a control mechanism configured to retract the movable pin based on an electrical control signal; when the control mechanism causes the movable pin to retract, the spring causes the pawl to rotate about the second axis to come into contact with the radial surface of the ramp section of the second shaft portion; and as the pawl applies pressure against the ramp section of the second shaft portion as it rotates about the first axis, the pressure of the pawl against an increase in the height of the axial surface of the ramp section of the second shaft portion about the first axis causes the second shaft portion to move away from the first shaft portion axially along the first axis such that the second coupling features of the second shaft portion disengage from the first coupling features of the first shaft portion to cause the first shaft portion and the second shaft portion to no longer rotate together, thereby mechanically disconnecting the second shaft portion from the first shaft portion.

A method of operating a resettable mechanical disconnect comprises: receiving an electrical control signal at a control mechanism; causing, based on the electrical control signal received at the control mechanism, a movable pin to retract, allowing a spring to cause a pawl to rotate about a first axis to come into contact with a radial surface of a ramp section of a first shaft portion of a resettable mechanical disconnect; and allowing the spring to cause the pawl to apply pressure against an axial surface of the ramp section of the first shaft portion as it rotates about a second axis, the pressure of the pawl against an increase in height of the axial surface of the ramp section of the first shaft portion about the second axis cause the first shaft portion to move away from a second shaft portion axially along the second axis such that first coupling features of the first shaft portion disengage from second coupling features of the second shaft portion to cause the first shaft portion and the second shaft portion to no longer rotate together, thereby mechanically disconnecting the first shaft portion from the second shaft portion.

A resettable mechanical disconnect comprises: a first shaft portion positioned about a first axis and having first coupling features positioned at a first end of the first shaft portion; and a second shaft portion positioned about the first axis and adjacent to the first shaft portion, the second shaft portion having: second coupling features positioned at a second end of the second shaft portion and configured to engage with the first coupling features of the first shaft portion to cause the first shaft portion and the second shaft portion to rotate together radially about the first axis; and a ramp section positioned around an outer surface of the second shaft portion, an axial surface of the ramp section increasing in height around the outer surface of the second shaft portion about the first axis, wherein the height of the axial surface of the ramp section increases as a first width of a radial surface of the ramp section of the outer surface of the second shaft portion decreases around the second shaft portion; a controllable spring loaded rotatable pawl apparatus having: a pawl configured to rotate about a second axis toward the radial surface of the ramp section of the second shaft portion; a spring configured to cause the pawl to rotate about the second axis toward the radial surface of the ramp section of the second shaft portion; a movable pin configured to retain the pawl in place away from the ramp section when extended; and a control mechanism configured to retract the movable pin based on an electrical control signal; when the control mechanism causes the movable pin to retract, the spring causes the pawl to rotate about the second axis to initially come into radial contact with the radial surface of the ramp section of the outer surface of the second shaft portion in a first section of the ramp section of the outer surface without being in axial contact with the axial surface of the ramp section, wherein the first width of the radial surface of the ramp section of the outer surface of the second shaft portion is wider than a second width of the pawl in the first section of the outer surface, wherein the pawl subsequently comes into the axial contact with the ramp section as the second shaft portion rotates causing the pawl to apply pressure against the ramp section of the second shaft portion; and as the pawl applies pressure against the ramp section of the second shaft portion as it rotates about the first axis, the pressure of the pawl against an increase in the height of the ramp section of the second shaft portion about the first axis causes the second shaft portion to move away from the first shaft portion axially along the first axis such that the second coupling features of the second shaft portion disengage from the first coupling features of the first shaft portion to cause the first shaft portion and the second shaft portion to no longer rotate together, thereby mechanically disconnecting the second shaft portion from the first shaft portion.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which:

FIGS. 1A-1I illustrate components of an example resettable mechanical disconnect having a first shaft portion, a second shaft portion having a ramp section, a pawl, and a reset rod.

FIG. 3 is an example method for operating a resettable mechanical disconnect.

Figure 1A:
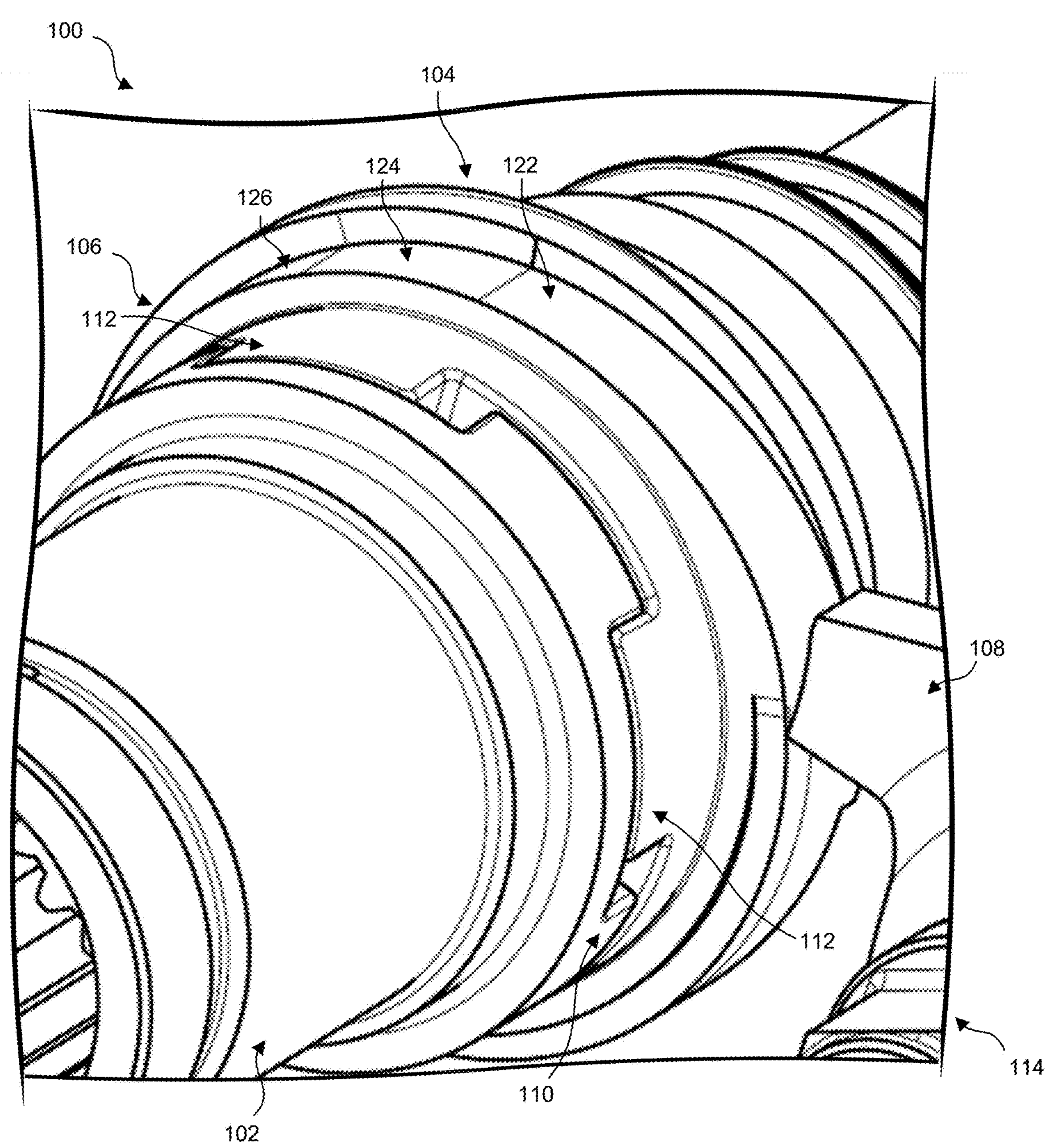

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In examples, a resettable mechanical disconnect (sometime abbreviated "RMD") is used for disconnection/connection of power transmission between two rotary machines (such as a main engine gearbox and a starter-generator). In examples, in case a failure is detected in any of these devices (such as when torque or temperature increase too high), a resettable mechanical disconnect can be activated and power transmission between the two machines is interrupted in order to prevent damage of the machine(s) or prevent negative effects on performance of the machine(s). In examples, after disconnection, a resettable mechanical disconnect can be manually re-connected on the ground to restore torque transmission between the two machines.

In examples, rotary machines are connected via a shaft with a section with a reduced diameter (sometime called a shear section). In examples, a shear section is designed to break after the shear section experiences a maximum torque exceeding a limit that the shear section is designed to withstand. In examples, shear sections have the disadvantage of only being able to be disconnected based on transmitted torque and not based on other inputs, such as temperature sensing. In examples, if a machine is equipped with a temperature sensor and the temperature is increasing (such as because bearings are jamming), the disconnection cannot be done unless larger damage is present which leads to the torque increase that would break the shaft at the shear section. In examples, a shaft with a broken shear section must be replaced after every disconnection by a new shear section because the shear section can only perform one disconnection.

Figure 1B:
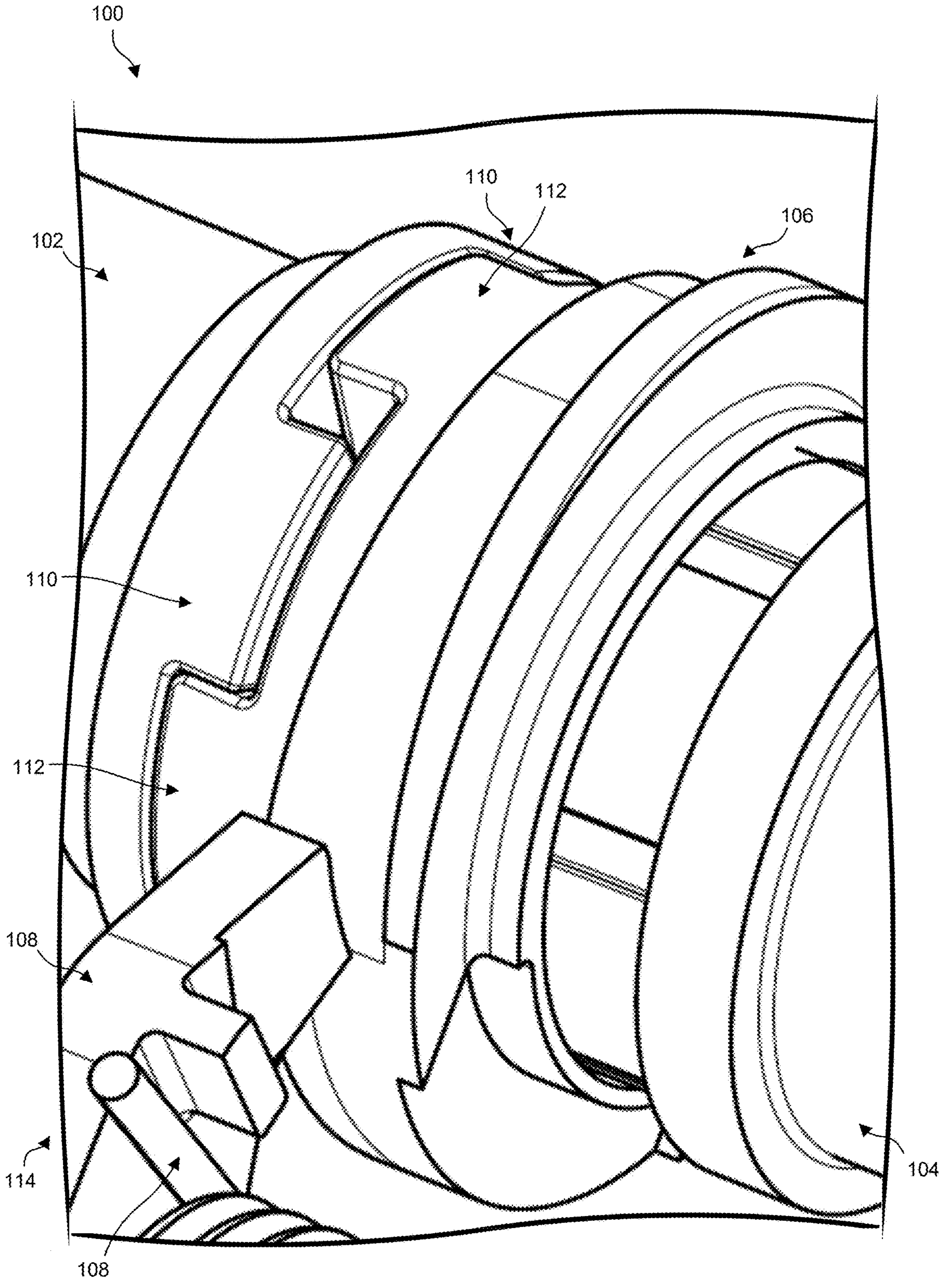
Figure 1C:
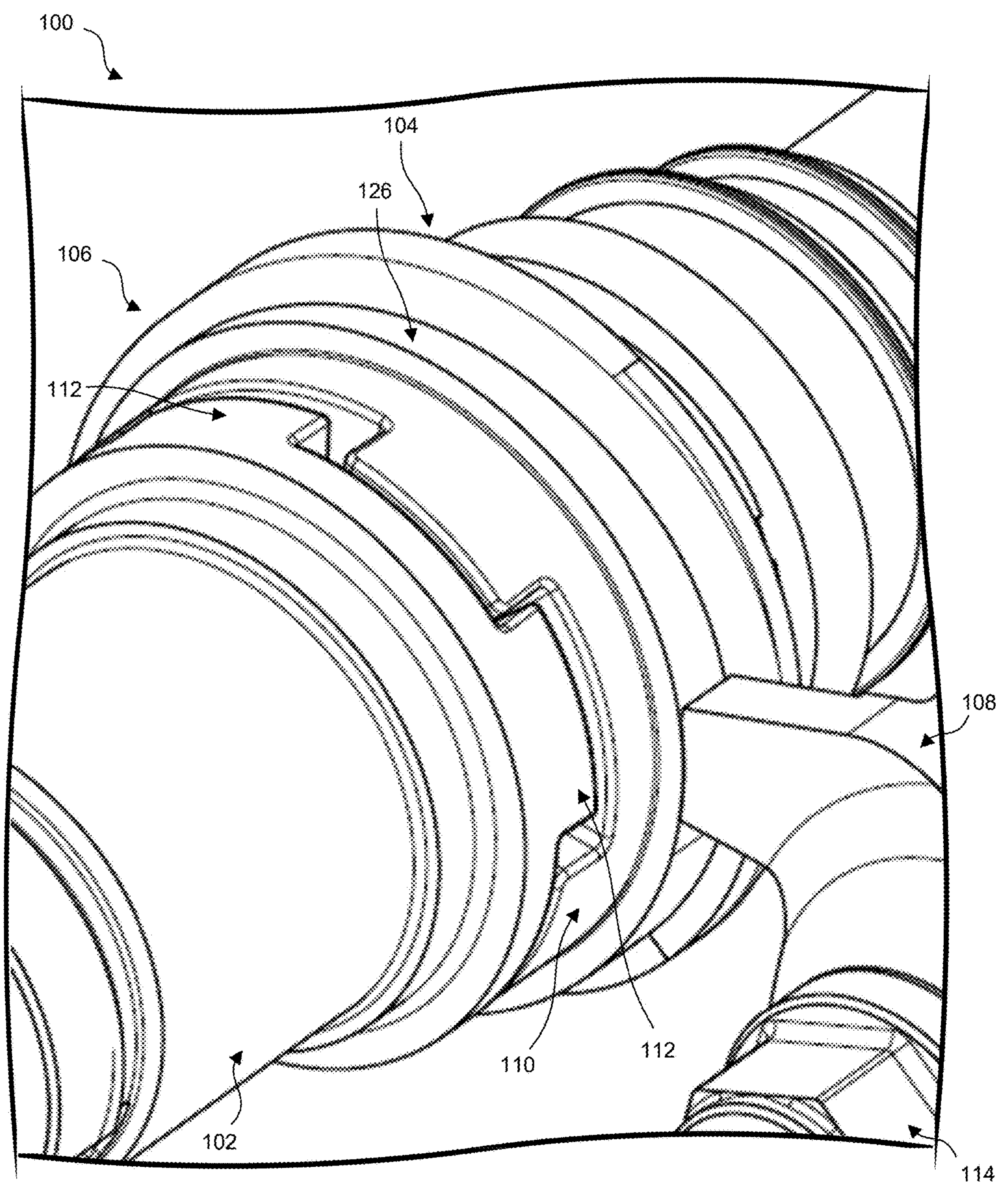
Figure 1D:
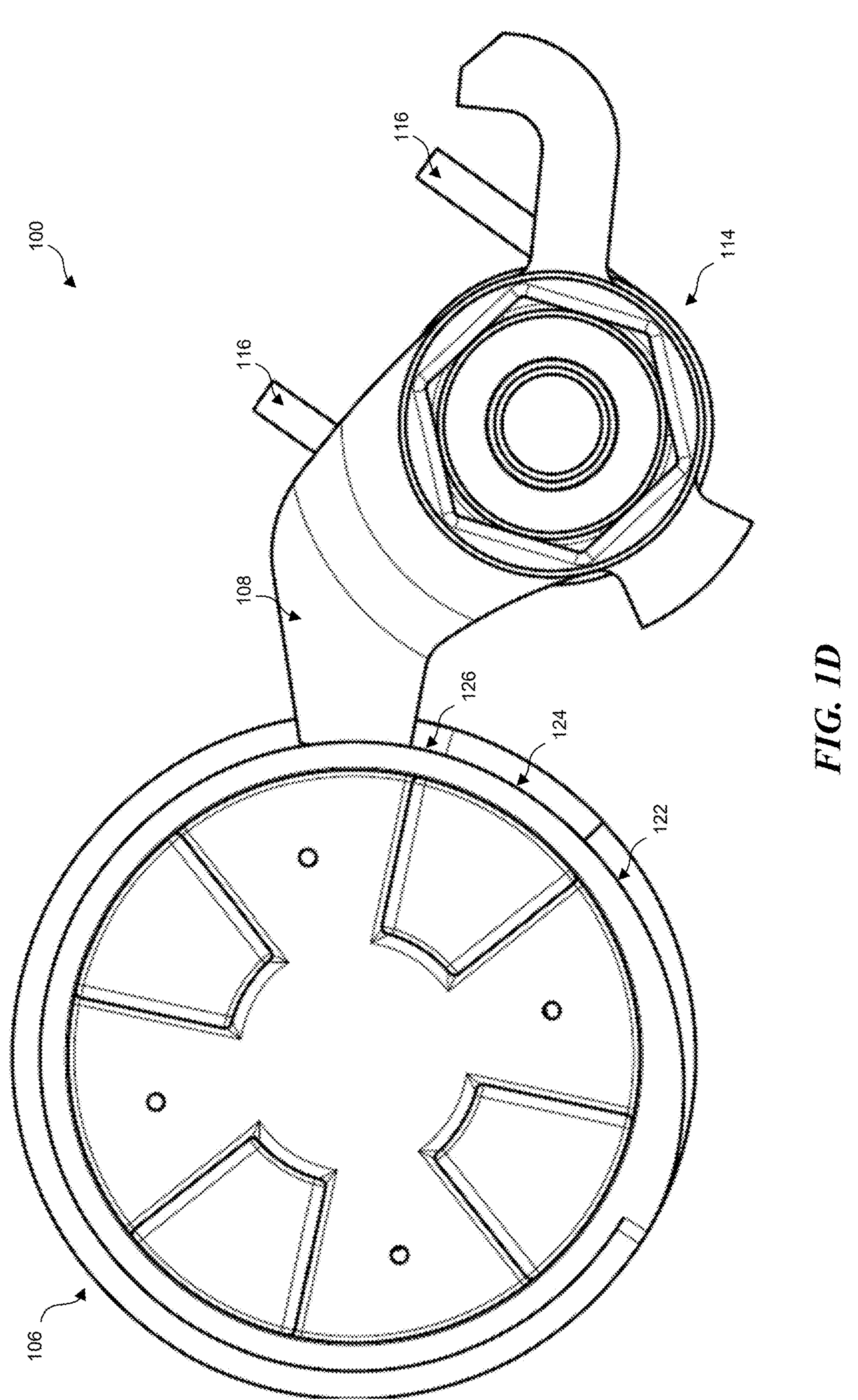
Figure 1E:
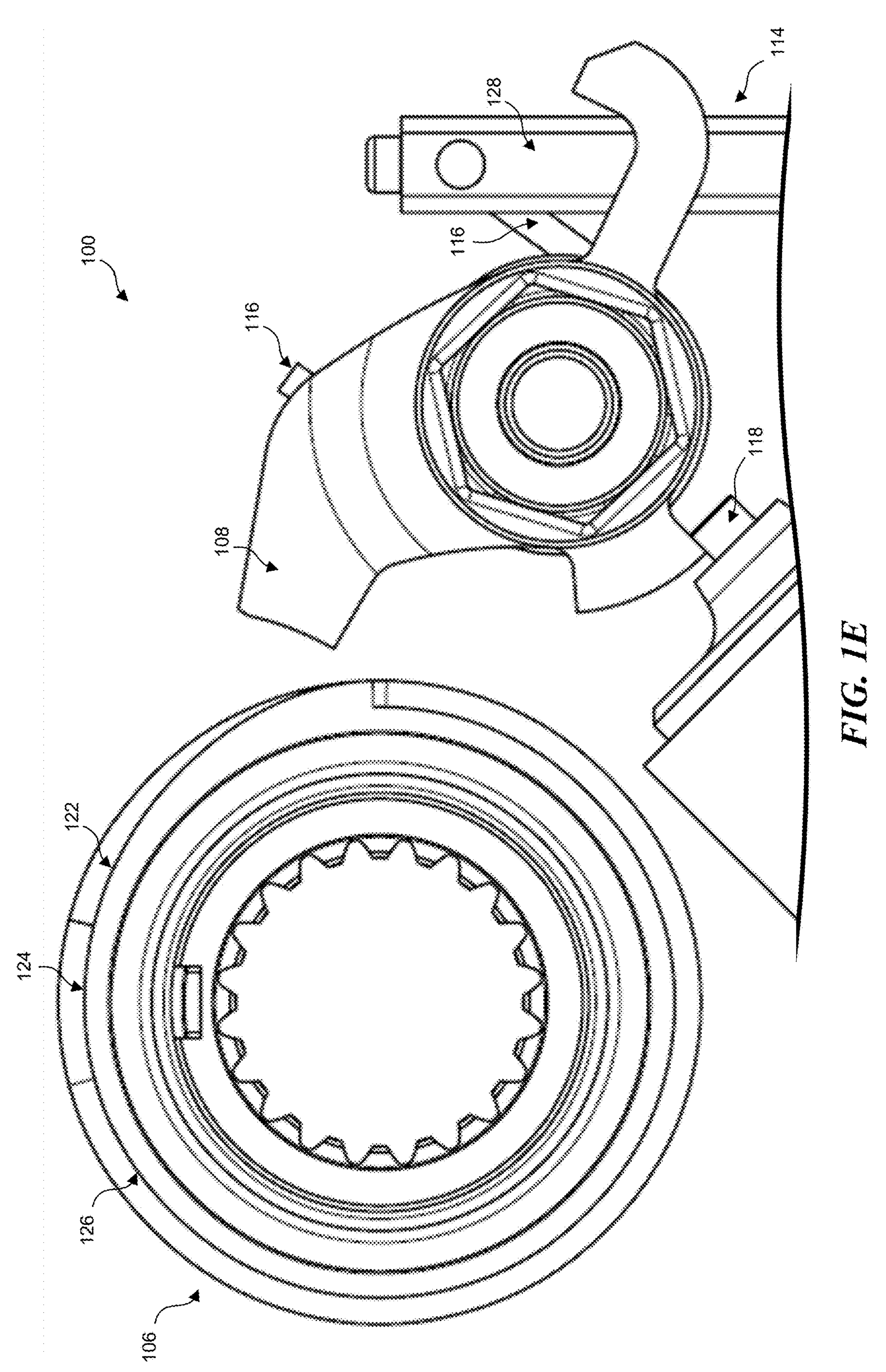
Figure 1F:
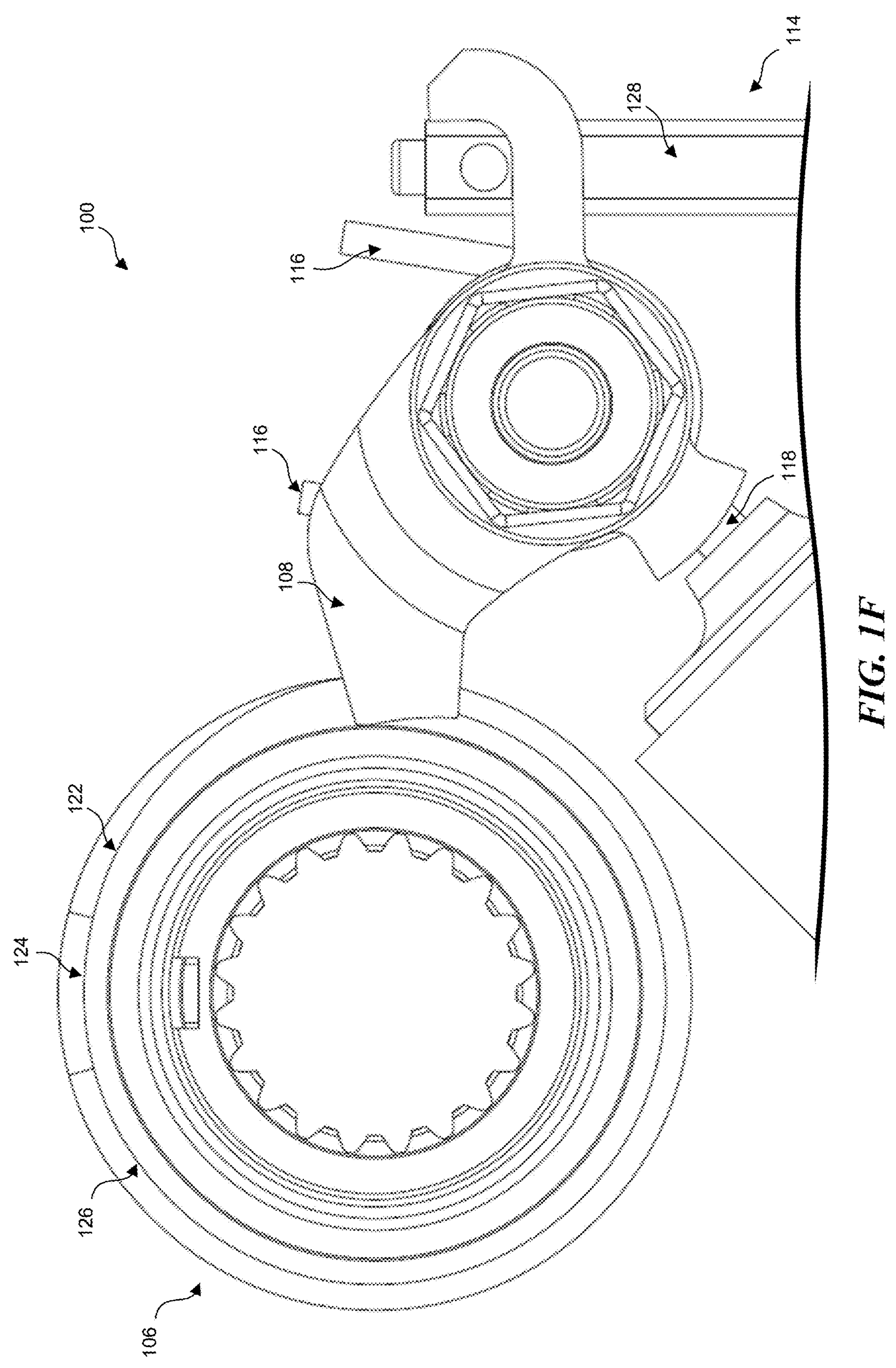
Figure 1G:
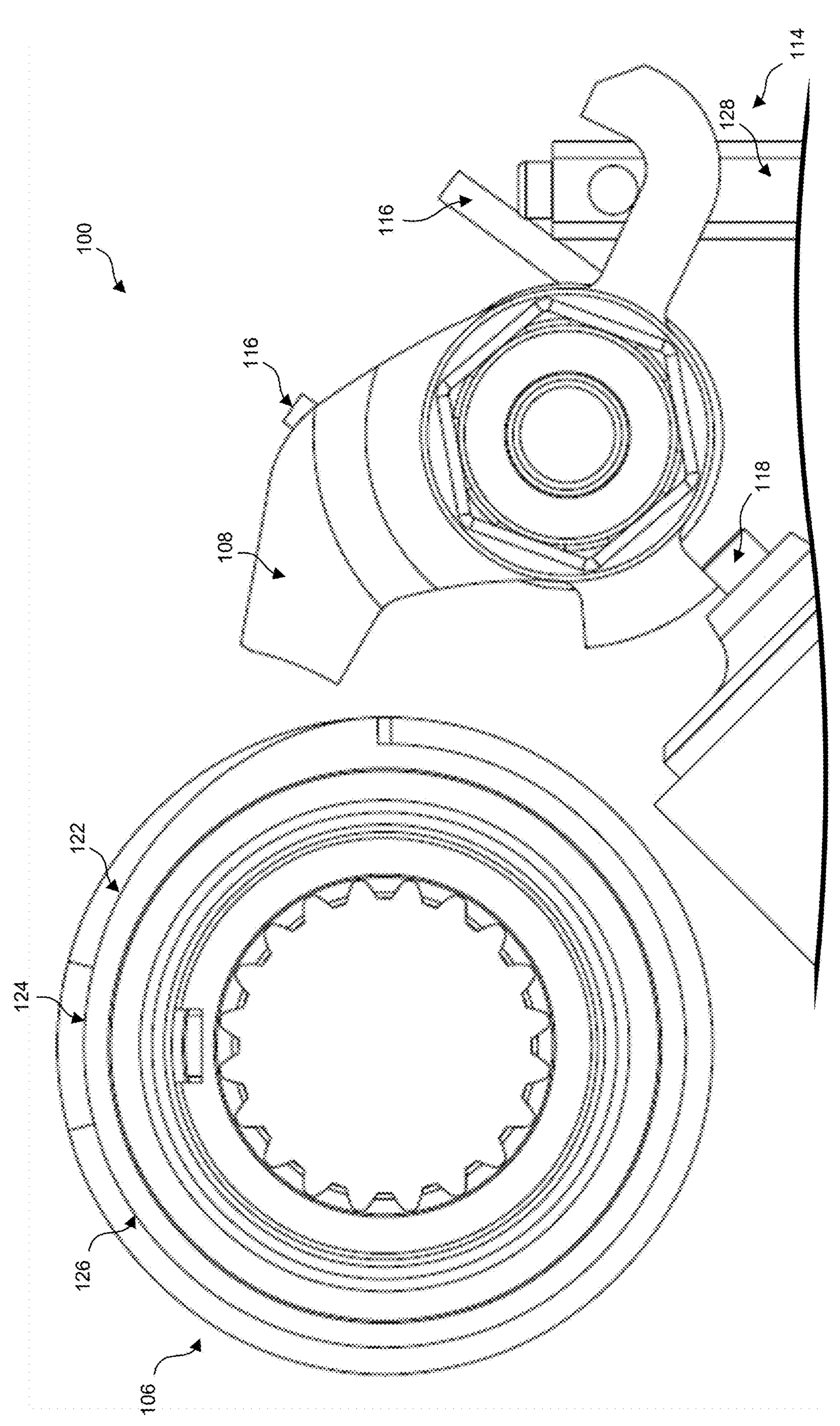
Figure 1H:
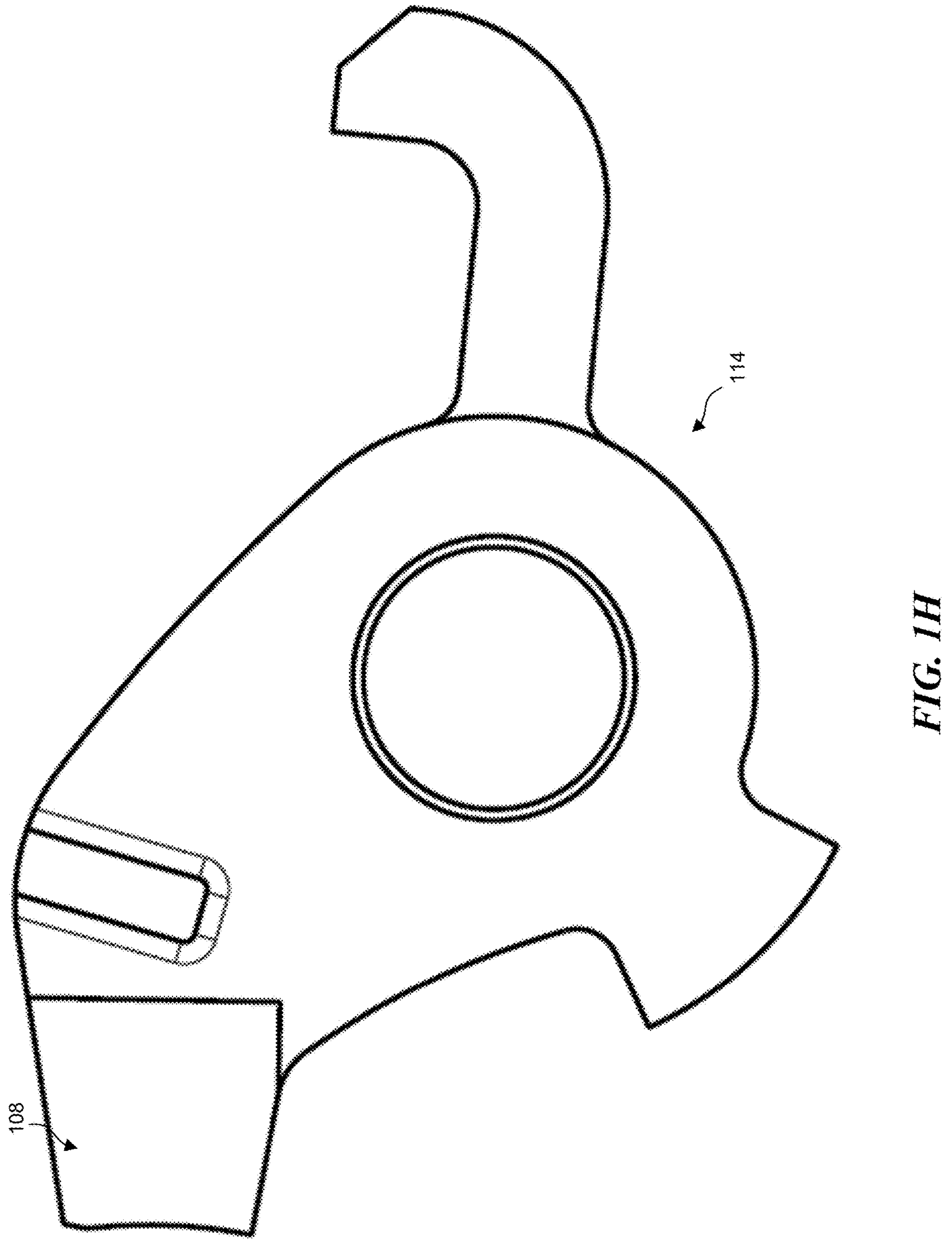
Figure 11:
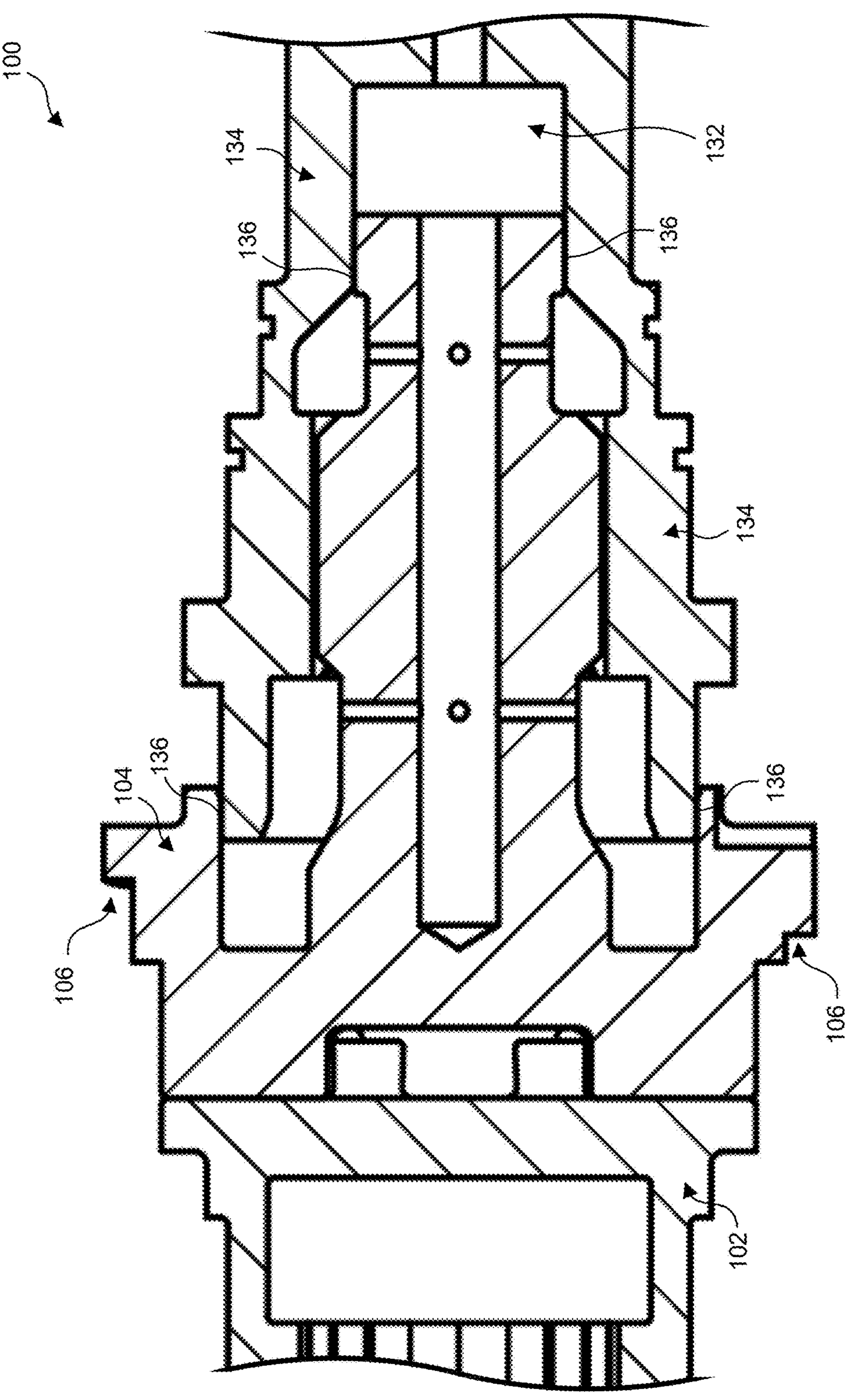

FIGS. 1A-I illustrate components of an example resettable mechanical disconnect 100 having a first shaft portion 102, a second shaft portion 104 having a ramp section 106, a pawl 108, and a reset rod 128. FIG. 1A shows a first perspective view of components of the resettable mechanical disconnect 100 as the pawl 108 begins to engage with the ramp section 106 of the second shaft portion 104. FIG. 1B shows a second perspective view of components of the resettable mechanical disconnect 100 as the pawl 108 begins to engage with the ramp section 106 of the second shaft portion 104. FIG. 1C shows a third perspective view of components of the resettable mechanical disconnect 100 after the pawl 108 is fully engaged with the ramp section 106 of the second shaft portion 104. FIG. 1D shows a cross sectional view of components of the resettable mechanical disconnect 100 after the pawl 108 is fully engaged with the ramp section 106 of the second shaft portion 104. FIG. 1E shows a side view of the pawl 108 and a reset rod 128 while the pawl 108 is an initial position ready to be triggered. FIG. 1F shows a side view of the pawl 108 and the reset rod 128 after the pawl 108 is triggered and ready to be reset. FIG. 1G shows a side view of the pawl 108 and the reset rod 128 as the pawl 108 is being reset using the reset rod 128. FIG. 1H shows a side view of the example pawl 108. FIG. 1I shows a side cross sectional view of components of an example resettable mechanical disconnect 100 including the first shaft portion 102, the second shaft portion 104, and the ramp.

In examples, the resettable mechanical disconnect 100 includes the first shaft portion 102, the second shaft portion 104 having a ramp section 106, and a pawl 108. In examples, the first shaft portion 102 comprises first coupling features 110 positioned at a first end of the first shaft portion 102. In examples, the second shaft portion 104 comprises second coupling features 112 positioned at a second end of the second shaft portion 104. In examples, the first shaft portion 102 and the second shaft portion 104 are both positioned lengthwise about a first axis. In examples, the second coupling features 112 of the second shaft portion 104 are configured to engage with the first coupling features 110 of the first shaft portion 102 to cause the first shaft portion 102 and the second shaft portion 104 to rotate together radially about the first axis. In examples, the second shaft portion 104 comprises the ramp section 106 positioned around the outside surface of the second shaft portion 104. In examples, the ramp section 106 includes both a radial surface and an axial surface. In examples, the ramp section 106 increases in height of its axial surface around a circumference of the second shaft portion 104 about the first axis while decreasing in width of its radial surface around the circumference of the second shaft portion 104. In examples, the radial surface of the ramp section 106 tapers in width from being widest when the axial surface is shortest to becoming narrower as the axial surface becomes taller.

In examples, the pawl 108 is a guillotine pawl. In examples, the pawl 108 is part of a controllable spring loaded rotatable pawl apparatus 114. In examples, the controllable spring loaded rotatable pawl apparatus 114 comprises the pawl 108 configured to rotate about a second axis toward the radial surface of the ramp section 106 of the second shaft portion 104. In examples, the controllable spring loaded rotatable pawl apparatus 114 comprises a spring 116 configured to cause the pawl 108 to rotate about the second axis toward the radial surface of the ramp section 106 of the second shaft portion 104. In examples, the controllable spring loaded rotatable pawl apparatus 114 includes a movable pin 118 (such as a solenoid pin) configured to retain the pawl 108 in place away from the radial surface of the ramp section 106 when the movable pin 118 is extended. In examples, the controllable spring loaded rotatable pawl apparatus 114 includes a control mechanism 120 configured to retract the movable pin 118 based on an electrical control signal. In examples, the electrical control signal can be received from an operator of the device (such as an aircraft or other vehicle) to disengage the first shaft portion 102 from the second shaft portion 104 if desirable to avoid damage to mechanical components connected by the first shaft portion 102 and the second shaft portion 104. This disconnection could occur even in situations where it is not possible to slow down the rotation of the first shaft portion 102 and/or the second shaft portion 104 (such as when a throttle cannot be turned off).

In examples, when the control mechanism 120 causes the movable pin 118 to retract, the spring 116 causes the pawl 108 to rotate about the second axis toward the radial surface of the second shaft portion 104 to come into radial contact with the radial surface of the second shaft portion 104. In examples, when the pawl 108 first comes into radial contact with the radial surface of the second shaft portion 104, it takes some time to settle down from bouncing on the radial surface of the second shaft portion 104 after initial contact with the radial surface of the second shaft portion 104. In examples, the ramp section 106 comprises a first section 122, a second section 124, and a third section 126. In examples, each of the first section 122, the second section 124, and the third section 126 include both a radial surface and an axial surface.

In examples, the radial surface of the second shaft portion is wider in the first section 122 than the pawl 108, allowing for some clearance between the pawl 108 and the axial surface of the ramp section 106 as the pawl 108 comes into contact with the radial surface of the second shaft portion 104 before the pawl 108 comes into contact with the axial surface of the ramp section 106 of the second shaft portion 104. In examples, the rotation of the pawl 108 is opposite to the rotation of the second shaft portion 104 (one of them is clockwise (CW) while the other is counter-clockwise (CCW)) such that the force down from the rotation of the second shaft portion 104 draws the pawl down using friction force into substantially complete contact with the radial surface of the second shaft portion 104 such that the torque on the pawl 108 helps hold it in radial contact against the radial surface of the second shaft portion 104.

In examples, the pawl 108 settles down from bouncing on the radial surface of the second shaft portion 104 while in the first section 122 and a second section 124 and is settled down before reaching a third section 126. In examples, an axial surface of the pawl 108 starts to connect and push against the axial surface of the ramp section 106 only after a sufficient edge (where the axial surface of the ramp section 106 is a sufficient/full axial height) is present in the third section 126. In examples, the axial surface of the pawl 108 comes into axial contact with the axial surface of the ramp section 106 in the third section 126. The first section 122 and second section 124 enable the pawl 108 to not come into axial contact with the axial surface of the ramp section 106 until the axial surface of the ramp section 106 has reached sufficient height (such as full height) in the third section 126. In examples, any of the first section 122 and/or second section 124 is referred to as the transition surface.

In examples, as the axial surface of the pawl 108 applies pressure against the axial surface of the ramp section 106 of the second shaft portion 104 as it rotates about the first axis, the pressure of the axial surface of the pawl against an increase in the height of the axial surface of the ramp section 106 of the second shaft portion 104 causes the second shaft portion 104 to move away from the first shaft portion 102 axially along the first axis such that the second coupling features 112 of the second shaft portion 104 disengage from the first coupling features 110 of the first shaft portion 102 to cause the first shaft portion 102 and the second shaft portion 104 to no longer rotate together, thereby mechanically disconnecting the second shaft portion 104 from the first shaft portion 102.

In examples, the resettable mechanical disconnect 100 can be reset by rotating the pawl 108 back past the movable pin 118 with the movable pin 118 extended so that the movable pin 118 retains the pawl 108 in place away from the ramp section 106. In examples, the resettable mechanical disconnect 100 is reset once the machine is no longer operating and the first shaft portion 102 and the second shaft portion 104 are no longer rotating. In examples, the resettable mechanical disconnect 100 would be reset manually by a technician or operator after the machine was inspected with components repaired or replaced as necessary.

In examples, such as shown in FIGS. 1E-1G, the reset rod 128 includes a reset rod pin 130. In examples, such as shown FIG. 1F, after the pawl 108 is triggered and ready to be reset, the reset rod 128 can be pulled down, such that the reset rod pin 130 pulls down on a portion of the rotatable pawl apparatus to bring the pawl back past movable pin 118 to reset the pawl 108 as shown in FIG. 1G. In examples, the reset rod 128 is guided inside a housing and an end of the reset rod 128 is sticking out of the housing so it can be manually operated. In examples, the movement (stroke) of the reset rod during resetting is between 10-14 mm.

In examples, such as shown in FIG. 1H, a radial surface of the tip of the pawl 108 (also referred to as pawl tip) has a curvature that matches the outer diameter of the radial surface of the second shaft portion 104 to enable substantially full contact between the radial surface of the tip of the pawl 108 (also referred to as pawl tip) and the outer diameter of the radial surface of the second shaft portion 104. In examples, the axial surface on the side of the tip of the pawl 108 (also referred to as pawl tip) that comes into contact with the axial surface of the ramp section 106 has an angle that substantially matches the angle of the axial surface of the ramp section 106 so that it comes into substantially full contact with the axial surface of the ramp section 106.

In examples, such as shown in FIG. 1I, as the second shaft portion 104 is pushed away from the first shaft portion 102, the second coupling features 112 are disconnected from the first coupling features 110 and the second shaft portion is guided into a cavity 132 in a third shaft portion 134 using guiding surfaces 136. In examples, the inner surface of the cavity 132 in the third shaft portion 134 has a diameter that is slightly larger than the outer surface of the second shaft portion 104 to offer some clearance to be able to move in and out of the cavity 132 while still being guided using the guiding surfaces 136 to stay concentric within the cavity 132. In examples, the second shaft portion 104 mechanically disconnecting from the first shaft portion 102 acts as a clutch. In examples, the resettable mechanical disconnect 100 can be used in combination with a shear section, such that the shear section can break as a sacrificial component if the resettable mechanical disconnect 100 is not disconnected before enough damage occurs to break the shear section.

Figure 2:
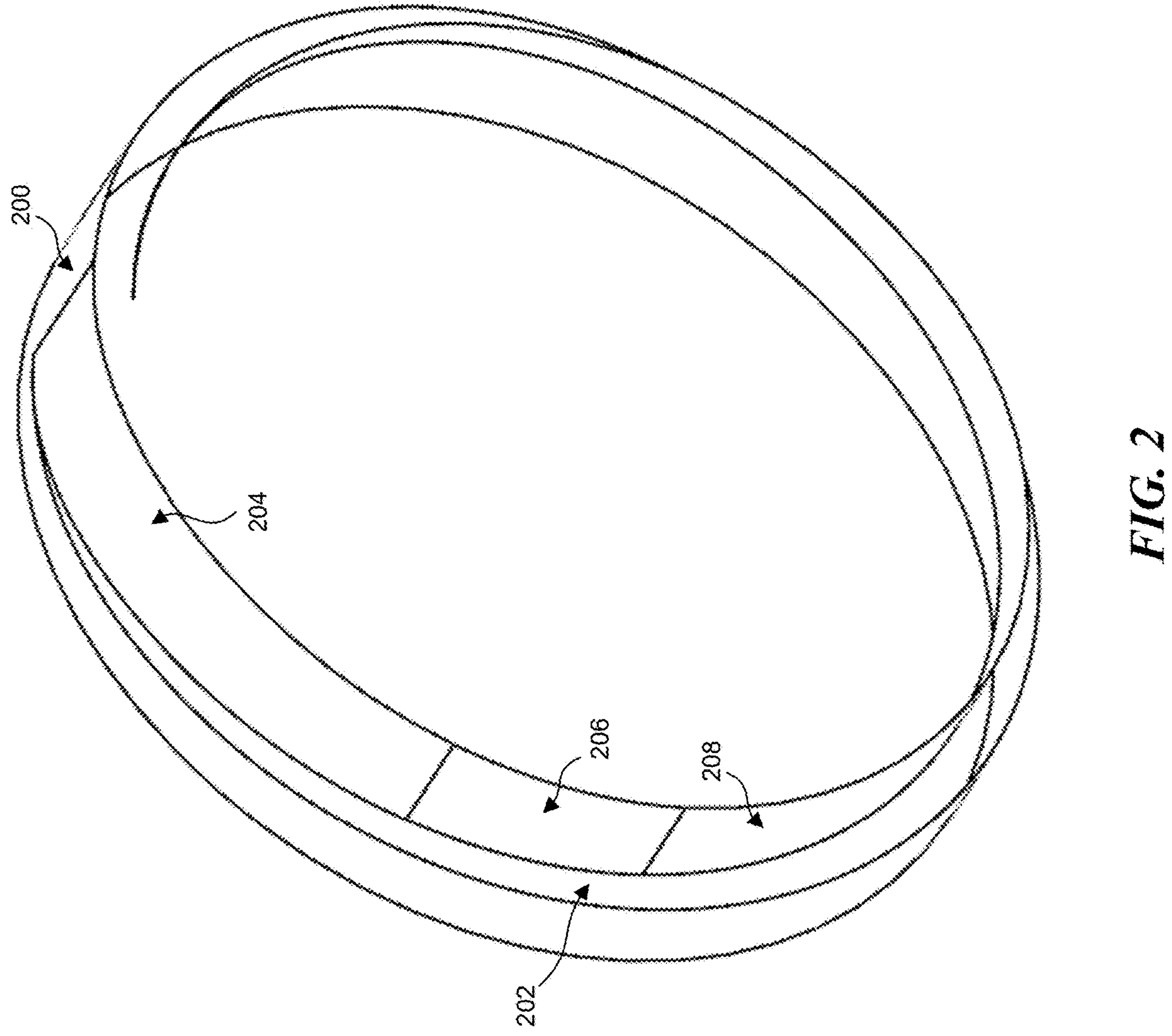
FIG. 2 illustrates an example shape of a varying diameter outer surface with an adjacent ramp section sidewall that increases in height along the outer diameter of the varying diameter outer surface.

FIG. 2 illustrates an example shape of a varying diameter radial surface 200 with a varying height axial surface 202 (also referred to as the ramp sidewall) that increases in height along the outer diameter of the varying diameter radial surface 200. In examples, the varying diameter radial surface 200 and the varying height axial surface 202 (also referred to as the ramp sidewall) can be used as the shape of ramp section 106 of an example resettable mechanical disconnect 100. In examples, the varying diameter radial surface 200 includes a first section 204 (such as first section 122) that is wider at the starting point than a pawl (such as pawl 108), allowing for some clearance between the pawl (such as pawl 108) and the varying height axial surface 202 (also referred to as the ramp sidewall) adjacent to the varying diameter radial surface 200 (such as the radial surface of the ramp section 106) as the pawl (such as pawl 108) comes into radial contact with the outside radial surface of the varying diameter radial surface 200 before the pawl (such as pawl 108) comes into axial contact with the varying height axial surface 202 (also referred to as the ramp sidewall) (such as the axial surface of the ramp section 106) adjacent to the varying diameter radial surface 200. In examples, the pawl (such as pawl 108) settles down from bouncing on the outside surface of the varying diameter radial surface 200 while in the first section 204 (such as first section 122) and a second section 206 (such as second section 124) and is settled down from bouncing before reaching a third section 208 (such as third section 126). In examples, an axial surface of a pawl (such as a pawl 108) starts to connect and push against the axial surface of the varying height axial surface 202 (also referred to as the ramp sidewall) (such as the axial surface of the ramp section 106) adjacent to the varying diameter radial surface 200 only after a sufficient edge (where the varying height axial surface 202 (also referred to as the ramp sidewall) such as the axial surface of the ramp section 106 is a sufficient/full axial height) is present in the third section 208 (such as third section 126). In examples, the axial surface of the pawl (such as pawl 108) comes into axial contact with the axial surface of the varying height axial surface 202 (also referred to as the ramp sidewall) adjacent to the radial surface of the varying diameter radial surface 200 (such as ramp section 106) in the third section 208 (such as third section 126). In examples, the first section 204 (such as first section 122) and the second section 206 (such as second section 124) enable the pawl (such as pawl 108) to not come into axial contact with the axial surface of the varying height axial surface 202 (also referred to as the ramp sidewall) of the varying diameter radial surface 200 (such as first section 204) until the varying height axial surface 202 (also referred to as the ramp sidewall) has reached sufficient height (such as full height) in the third section 208 (such as third section 126). In examples, any of the first section 204 (such as first section 122) and/or the second section 206 (such as second section 124) is referred to as the transition surface as it is how the pawl transitions to smoothly disconnect the two shafts.

FIG. 3 is an example method 300 for operating a resettable mechanical disconnect (such as resettable mechanical disconnect 100 shown in the Figures and described herein). In examples, method 300 begins at block 302 with receiving an electrical control signal at a control mechanism. In examples, method 300 proceeds to block 304 with causing, based on the electrical control signal received at the control mechanism, a movable pin to retract, allowing a spring to cause a pawl to rotate about a first axis to come into contact with a ramp section of a first shaft portion of a resettable mechanical disconnect. In examples, method 300 proceeds to block 306 with applying the spring to cause the pawl to apply pressure against the ramp section of the first shaft portion as it rotates about a second axis, the pressure of the pawl against an increase in the height of the ramp section of the first shaft portion about the second axis cause the first shaft portion to move away from a second shaft portion axially along the second axis such that first coupling features of the first shaft portion disengage from second coupling features of the second shaft portion to cause the first shaft portion and the second shaft portion to no longer rotate together, thereby mechanically disconnecting the first shaft portion from the second shaft portion.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLES

Example 1 includes a resettable mechanical disconnect, comprising: a first shaft portion positioned about a first axis and having first coupling features positioned at a first end of the first shaft portion; and a second shaft portion positioned about the first axis and adjacent to the first shaft portion, the second shaft portion having: second coupling features positioned at a second end of the second shaft portion and configured to engage with the first coupling features of the first shaft portion to cause the first shaft portion and the second shaft portion to rotate together radially about the first axis; and a ramp section positioned around an outer surface of the second shaft portion, an axial surface of the ramp section increasing in height around the outer surface of the second shaft portion about the first axis; a controllable spring loaded rotatable pawl apparatus having: a pawl configured to rotate about a second axis toward a radial surface of the ramp section of the second shaft portion; a spring configured to cause the pawl to rotate about the second axis toward the radial surface of the ramp section of the second shaft portion; a movable pin configured to retain the pawl in place away from the ramp section when extended; and a control mechanism configured to retract the movable pin based on an electrical control signal; when the control mechanism causes the movable pin to retract, the spring causes the pawl to rotate about the second axis to come into contact with the radial surface of the ramp section of the second shaft portion; and as the pawl applies pressure against the ramp section of the second shaft portion as it rotates about the first axis, the pressure of the pawl against an increase in the height of the axial surface of the ramp section of the second shaft portion about the first axis causes the second shaft portion to move away from the first shaft portion axially along the first axis such that the second coupling features of the second shaft portion disengage from the first coupling features of the first shaft portion to cause the first shaft portion and the second shaft portion to no longer rotate together, thereby mechanically disconnecting the second shaft portion from the first shaft portion.

Example 2 includes the resettable mechanical disconnect of Example 1, further comprising: wherein the pawl is configured to be rotated back into position about the second axis and past the movable pin; and wherein the movable pin is configured to extend so that it holds the pawl from rotating about the second axis and prevents the pawl from coming into contact with the ramp section of the second shaft portion of the resettable mechanical disconnect.

Example 3 includes the resettable mechanical disconnect of any of Examples 1-2, further comprising: wherein the height of the axial surface of the ramp section increases as a first width of the radial surface of the ramp section of the outer surface of the second shaft portion decreases around the second shaft portion.

Example 4 includes the resettable mechanical disconnect of Example 3, further comprising: wherein the first width of the radial surface of the ramp section of the outer surface of the second shaft portion is wider than a second width of the pawl in a first section of the ramp section.

Example 5 includes the resettable mechanical disconnect of any of Examples 1-4, further comprising: when the control mechanism causes the movable pin to retract, the spring causes the pawl to rotate about the second axis to initially come into radial contact with the radial surface of the ramp section of the outer surface of the second shaft portion.

Example 6 includes the resettable mechanical disconnect of any of Examples 1-5, further comprising: wherein the height of the axial surface of the ramp section increases as a first width of the radial surface of the ramp section of the outer surface of the second shaft portion decreases around the second shaft portion; wherein the first width of the radial surface of the ramp section of the outer surface of the second shaft portion is wider than a second width of the pawl in a first section of the outer surface; and when the control mechanism causes the movable pin to retract, the spring causes the pawl to rotate about the second axis to initially come into radial contact with the radial surface of the ramp section of the outer surface of the second shaft portion in the first section of the ramp section of the outer surface without being in axial contact with the axial surface of the ramp section.

Example 7 includes the resettable mechanical disconnect of Example 6, further comprising: wherein the pawl comes into the axial contact with the axial surface of the ramp section as the second shaft portion rotates causing the pawl to apply the pressure against the axial surface of the ramp section of the second shaft portion.

Example 8 includes the resettable mechanical disconnect of any of Examples 1-7, further comprising: wherein the second shaft portion moves into a cavity of a third shaft portion as the second shaft portion moves away from the first shaft portion axially along the first axis.

Example 9 includes the resettable mechanical disconnect of Example 8, further comprising: wherein the second shaft portion comprises guiding surfaces that are smaller in outer diameter than corresponding guiding surfaces on an inner diameter of the cavity of the third shaft portion, wherein the guiding surfaces of the second shaft portion and the corresponding guiding surfaces of the third shaft portion guide the second shaft portion inside the cavity of the third shaft portion as the second shaft portion moves away from the first shaft portion axially along the first axis.

Example 10 includes a method of operating a resettable mechanical disconnect, comprising: receiving an electrical control signal at a control mechanism; causing, based on the electrical control signal received at the control mechanism, a movable pin to retract, allowing a spring to cause a pawl to rotate about a first axis to come into contact with a radial surface of a ramp section of a first shaft portion of a resettable mechanical disconnect; and allowing the spring to cause the pawl to apply pressure against an axial surface of the ramp section of the first shaft portion as it rotates about a second axis, the pressure of the pawl against an increase in height of the axial surface of the ramp section of the first shaft portion about the second axis cause the first shaft portion to move away from a second shaft portion axially along the second axis such that first coupling features of the first shaft portion disengage from second coupling features of the second shaft portion to cause the first shaft portion and the second shaft portion to no longer rotate together, thereby mechanically disconnecting the first shaft portion from the second shaft portion.

Example 11 includes the method of Example 10, further comprising resetting the resettable mechanical disconnect by: rotating the pawl about the second axis and back into position past the movable pin; and extending the movable pin so that it holds the pawl from rotating about the second axis and prevents the pawl from coming into contact with the ramp section of the first shaft portion of the resettable mechanical disconnect.

Example 12 includes the method of any of Examples 10-11, further comprising: wherein the height of the axial surface of the ramp section increases as a first width of an outer surface of the radial surface of the ramp section of the second shaft portion decreases around the second shaft portion.

Example 13 includes the method of Example 12, further comprising: wherein the first width of the radial surface of the ramp section of the outer surface of the second shaft portion is wider than a second width of the pawl in a first section of the ramp section.

Example 14 includes the method of any of Examples 10-13, further comprising: when the control mechanism causes the movable pin to retract, the spring causes the pawl to rotate about the second axis to initially come into radial contact with the radial surface of the ramp section of an outer surface of the second shaft portion.

Example 15 includes the method of any of Examples 10-14, further comprising: wherein the height of the axial surface of the ramp section increases as a first width of the radial surface of the ramp section of an outer surface of the second shaft portion decreases around the second shaft portion; wherein the first width of the outer surface of the ramp section of the outer surface of the second shaft portion is wider than a second width of the pawl in a first section of the outer surface; and allowing the spring to cause the pawl to initially come into radial contact with the radial surface of the ramp section of the outer surface of the second shaft portion in the first section of the ramp section of the outer surface without being in axial contact with the axial surface of the ramp section.

Example 16 includes the method of Example 15, further comprising: allowing the spring to cause the pawl to come into the axial contact with the axial surface of the ramp section as the second shaft portion rotates causing the pawl to apply the pressure against the axial surface of the ramp section of the second shaft portion.

Example 17 includes the method of any of Examples 10-16, further comprising: wherein the second shaft portion moves into a cavity of a third shaft portion as the second shaft portion moves away from the first shaft portion axially along the first axis.

Example 18 includes the method of Example 17, further comprising: using guiding surfaces of the second shaft portion that are smaller in outer diameter than corresponding guiding surfaces on an inner diameter of the cavity of the third shaft portion to guide the second shaft portion inside the cavity of the third shaft portion as the second shaft portion moves away from the first shaft portion axially along the first axis.

Example 19 includes a resettable mechanical disconnect, comprising: a first shaft portion positioned about a first axis and having first coupling features positioned at a first end of the first shaft portion; and a second shaft portion positioned about the first axis and adjacent to the first shaft portion, the second shaft portion having: second coupling features positioned at a second end of the second shaft portion and configured to engage with the first coupling features of the first shaft portion to cause the first shaft portion and the second shaft portion to rotate together radially about the first axis; and a ramp section positioned around an outer surface of the second shaft portion, an axial surface of the ramp section increasing in height around the outer surface of the second shaft portion about the first axis, wherein the height of the axial surface of the ramp section increases as a first width of a radial surface of the ramp section of the outer surface of the second shaft portion decreases around the second shaft portion; a controllable spring loaded rotatable pawl apparatus having: a pawl configured to rotate about a second axis toward the radial surface of the ramp section of the second shaft portion; a spring configured to cause the pawl to rotate about the second axis toward the radial surface of the ramp section of the second shaft portion; a movable pin configured to retain the pawl in place away from the ramp section when extended; and a control mechanism configured to retract the movable pin based on an electrical control signal; when the control mechanism causes the movable pin to retract, the spring causes the pawl to rotate about the second axis to initially come into radial contact with the radial surface of the ramp section of the outer surface of the second shaft portion in a first section of the ramp section of the outer surface without being in axial contact with the axial surface of the ramp section, wherein the first width of the radial surface of the ramp section of the outer surface of the second shaft portion is wider than a second width of the pawl in the first section of the outer surface, wherein the pawl subsequently comes into the axial contact with the ramp section as the second shaft portion rotates causing the pawl to apply pressure against the ramp section of the second shaft portion; and as the pawl applies pressure against the ramp section of the second shaft portion as it rotates about the first axis, the pressure of the pawl against an increase in the height of the ramp section of the second shaft portion about the first axis causes the second shaft portion to move away from the first shaft portion axially along the first axis such that the second coupling features of the second shaft portion disengage from the first coupling features of the first shaft portion to cause the first shaft portion and the second shaft portion to no longer rotate together, thereby mechanically disconnecting the second shaft portion from the first shaft portion.

Example 20 includes the resettable mechanical disconnect of Example 19, further comprising: wherein the second shaft portion moves into a cavity of a third shaft portion as the second shaft portion moves away from the first shaft portion axially along the first axis; and wherein the second shaft portion comprises guiding surfaces that are smaller in outer diameter than corresponding guiding surfaces on an inner diameter of the cavity of the third shaft portion, wherein the guiding surfaces of the second shaft portion and the corresponding guiding surfaces of the third shaft portion guide the second shaft portion inside the cavity of the third shaft portion as the second shaft portion moves away from the first shaft portion axially along the first axis.

What is claimed is:

1. A resettable mechanical disconnect, comprising:
- a first shaft portion positioned about a first axis and having first coupling features positioned at a first end of the first shaft portion; and
- a second shaft portion positioned about the first axis and adjacent to the first shaft portion, the second shaft portion having:
  - second coupling features positioned at a second end of the second shaft portion and configured to engage with the first coupling features of the first shaft portion to cause the first shaft portion and the second shaft portion to rotate together radially about the first axis; and
  - a ramp section positioned around an outer surface of the second shaft portion, an axial surface of the ramp section increasing in height, substantially parallel to the first axis, around the outer surface of the second shaft portion about the first axis;
- a controllable spring loaded rotatable pawl apparatus having:
  - a pawl configured to rotate about a second axis toward a radial surface of the ramp section of the second shaft portion;
  - a spring configured to cause the pawl to rotate about the second axis toward the radial surface of the ramp section of the second shaft portion;
  - a movable pin configured to retain the pawl in place away from the ramp section when extended; and
  - a control mechanism configured to retract the movable pin based on an electrical control signal;
- when the control mechanism causes the movable pin to retract, the spring causes the pawl to rotate about the second axis to come into contact with the radial surface of the ramp section of the second shaft portion; and
- as the pawl applies pressure against the ramp section of the second shaft portion as the ramp section of the second shaft portion rotates about the first axis, the pressure of the pawl against an increase in the height, substantially parallel to the first axis, of the axial surface of the ramp section of the second shaft portion about the first axis causes the second shaft portion to move away from the first shaft portion axially along the first axis such that the second coupling features of the second shaft portion disengage from the first coupling features of the first shaft portion to cause the first shaft portion and the second shaft portion to no longer rotate together, thereby mechanically disconnecting the second shaft portion from the first shaft portion.

2. The resettable mechanical disconnect of claim 1, further comprising:
- wherein the pawl is configured to be rotated about the second axis and back into a position where a portion of the pawl is past the movable pin; and
- wherein the movable pin is configured to extend so that the movable pin holds the pawl from rotating about the second axis and prevents the pawl from coming into contact with the ramp section of the second shaft portion of the resettable mechanical disconnect.

3. The resettable mechanical disconnect of claim 1, further comprising:
- wherein the height, substantially parallel to the first axis, of the axial surface of the ramp section increases around the outer surface of the second shaft portion as a first width, substantially parallel to the first axis, of the radial surface of the ramp section of the outer surface of the second shaft portion decreases around the second shaft portion.

4. The resettable mechanical disconnect of claim 3, further comprising:
- wherein the first width, substantially parallel to the first axis, of the radial surface of the ramp section of the outer surface of the second shaft portion is wider than a second width, substantially parallel to the second axis, of the pawl in a first section of the ramp section.

5. The resettable mechanical disconnect of claim 1, further comprising:
- when the control mechanism causes the movable pin to retract, the spring causes the pawl to rotate about the second axis to initially come into radial contact with the radial surface of the ramp section of the outer surface of the second shaft portion.

6. The resettable mechanical disconnect of claim 1, further comprising:

wherein the height, substantially parallel to the first axis, of the axial surface of the ramp section increases around the outer surface of the second shaft portion as a first width, substantially parallel to the first axis, of the radial surface of the ramp section of the outer surface of the second shaft portion decreases around the second shaft portion;

wherein the first width, substantially parallel to the first axis, of the radial surface of the ramp section of the outer surface of the second shaft portion is wider than a second width, substantially parallel to the second axis, of the pawl in a first section of the outer surface; and when the control mechanism causes the movable pin to retract, the spring causes the pawl to rotate about the second axis to initially come into radial contact with the radial surface of the ramp section of the outer surface of the second shaft portion in the first section of the ramp section of the outer surface without being in axial contact with the axial surface of the ramp section.

7. The resettable mechanical disconnect of claim 6, further comprising:

wherein the pawl comes into the axial contact with the axial surface of the ramp section as the second shaft portion rotates causing the pawl to apply the pressure against the axial surface of the ramp section of the second shaft portion.

8. The resettable mechanical disconnect of claim 1, further comprising:

wherein the second shaft portion moves into a cavity of a third shaft portion as the second shaft portion moves away from the first shaft portion axially along the first axis.

9. The resettable mechanical disconnect of claim 8, further comprising:

wherein the second shaft portion comprises guiding surfaces that are smaller in outer diameter than corresponding guiding surfaces on an inner diameter of the cavity of the third shaft portion, wherein the guiding surfaces of the second shaft portion and the corresponding guiding surfaces of the third shaft portion guide the second shaft portion inside the cavity of the third shaft portion as the second shaft portion moves away from the first shaft portion axially along the first axis.

10. A method of operating a resettable mechanical disconnect, comprising:

receiving an electrical control signal at a control mechanism;

causing, based on the electrical control signal received at the control mechanism, a movable pin to retract, allowing a spring to cause a pawl to rotate about a first axis to come into contact with a radial surface of a ramp section of a first shaft portion of a resettable mechanical disconnect; and allowing the spring to cause the pawl to apply pressure against an axial surface of the ramp section of the first shaft portion as the ramp section of the first shaft portion rotates about a second axis, the pressure of the pawl against an increase in height, substantially parallel to the first axis, of the axial surface of the ramp section of the first shaft portion about the second axis cause the first shaft portion to move away from a second shaft portion axially along the second axis such that first coupling features of the first shaft portion disengage from second coupling features of the second shaft portion to cause the first shaft portion and the second shaft portion to no longer rotate together, thereby mechanically disconnecting the first shaft portion from the second shaft portion.

11. The method of claim 10, further comprising resetting the resettable mechanical disconnect by:

rotating the pawl about the second axis and back into a position where a portion of the pawl is past the movable pin; and extending the movable pin so that the movable pin holds the pawl from rotating about the second axis and prevents the pawl from coming into contact with the ramp section of the first shaft portion of the resettable mechanical disconnect.

12. The method of claim 10, further comprising:

wherein the height, substantially parallel to the first axis, of the axial surface of the ramp section increases around an outer surface of the second shaft portion as a first width, substantially parallel to the first axis, of the outer surface of the radial surface of the ramp section of the second shaft portion decreases around the second shaft portion.

13. The method of claim 12, further comprising:

wherein the first width, substantially parallel to the first axis, of the radial surface of the ramp section of the outer surface of the second shaft portion is wider than a second width, substantially parallel to the second axis, of the pawl in a first section of the ramp section.

14. The method of claim 10, further comprising:

when the control mechanism causes the movable pin to retract, the spring causes the pawl to rotate about the second axis to initially come into radial contact with the radial surface of the ramp section of an outer surface of the second shaft portion.

15. The method of claim 10, further comprising:

wherein the height, substantially parallel to the first axis, of the axial surface of the ramp section increases around an outer surface of the second shaft portion as a first width, substantially parallel to the first axis, of the radial surface of the ramp section of the outer surface of the second shaft portion decreases around the second shaft portion;

wherein the first width, substantially parallel to the first axis, of the outer surface of the ramp section of the outer surface of the second shaft portion is wider than a second width, substantially parallel to the second axis, of the pawl in a first section of the outer surface; and allowing the spring to cause the pawl to initially come into radial contact with the radial surface of the ramp section of the outer surface of the second shaft portion in the first section of the ramp section of the outer surface without being in axial contact with the axial surface of the ramp section.

16. The method of claim 15, further comprising:

allowing the spring to cause the pawl to come into the axial contact with the axial surface of the ramp section as the second shaft portion rotates causing the pawl to apply the pressure against the axial surface of the ramp section of the second shaft portion.

17. The method of claim 10, further comprising:

wherein the second shaft portion moves into a cavity of a third shaft portion as the second shaft portion moves away from the first shaft portion axially along the first axis.

18. The method of claim 17, further comprising:

using guiding surfaces of the second shaft portion that are smaller in outer diameter than corresponding guiding surfaces on an inner diameter of the cavity of the third shaft portion to guide the second shaft portion inside the cavity of the third shaft portion as the second shaft portion moves away from the first shaft portion axially along the first axis.

19. A resettable mechanical disconnect, comprising:

a first shaft portion positioned about a first axis and having first coupling features positioned at a first end of the first shaft portion;

a second shaft portion positioned about the first axis and adjacent to the first shaft portion, the second shaft portion having:

second coupling features positioned at a second end of the second shaft portion and configured to engage with the first coupling features of the first shaft portion to cause the first shaft portion and the second shaft portion to rotate together radially about the first axis; and a ramp section positioned around an outer surface of the second shaft portion, an axial surface of the ramp section increasing in height, substantially parallel to the first axis, around the outer surface of the second shaft portion about the first axis, wherein the height, substantially parallel to the first axis, of the axial surface of the ramp section increases around the outer surface of the second shaft portion as a first width, substantially parallel to the first axis, of a radial surface of the ramp section of the outer surface of the second shaft portion decreases around the second shaft portion;

a controllable spring loaded rotatable pawl apparatus having:

a pawl configured to rotate about a second axis toward the radial surface of the ramp section of the second shaft portion;

a spring configured to cause the pawl to rotate about the second axis toward the radial surface of the ramp section of the second shaft portion;

a movable pin configured to retain the pawl in place away from the ramp section when extended; and a control mechanism configured to retract the movable pin based on an electrical control signal;

when the control mechanism causes the movable pin to retract, the spring causes the pawl to rotate about the second axis to initially come into radial contact with the radial surface of the ramp section of the outer surface of the second shaft portion in a first section of the ramp section of the outer surface without being in axial contact with the axial surface of the ramp section, wherein the first width, substantially parallel to the first axis, of the radial surface of the ramp section of the outer surface of the second shaft portion is wider than a second width, substantially parallel to the second axis, of the pawl in the first section of the outer surface, wherein the pawl subsequently comes into the axial contact with the ramp section as the second shaft portion rotates causing the pawl to apply pressure against the ramp section of the second shaft portion; and as the pawl applies the pressure against the ramp section of the second shaft portion as the ramp section of the second shaft portion rotates about the first axis, the pressure of the pawl against an increase in the height, substantially parallel to the first axis, of the ramp section of the second shaft portion about the first axis causes the second shaft portion to move away from the first shaft portion axially along the first axis such that the second coupling features of the second shaft portion disengage from the first coupling features of the first shaft portion to cause the first shaft portion and the second shaft portion to no longer rotate together, thereby mechanically disconnecting the second shaft portion from the first shaft portion.

20. The resettable mechanical disconnect of claim 19, further comprising:

wherein the second shaft portion moves into a cavity of a third shaft portion as the second shaft portion moves away from the first shaft portion axially along the first axis; and wherein the second shaft portion comprises guiding surfaces that are smaller in outer diameter than corresponding guiding surfaces on an inner diameter of the cavity of the third shaft portion, wherein the guiding surfaces of the second shaft portion and the corresponding guiding surfaces of the third shaft portion guide the second shaft portion inside the cavity of the third shaft portion as the second shaft portion moves away from the first shaft portion axially along the first axis.

* * * * *